US010816220B2

(12) United States Patent
Gonzalez (10) Patent No.: US 10,816,220 B2
(45) Date of Patent: Oct. 27, 2020

(54) ADVANCE HYBRID ROOF, ADVANCED COOL ROOF, ADVANCED SOLAR ROOF, READY ROOF

(71) Applicant: Mike Montauk Gonzalez, Manteca, CA (US)

(72) Inventor: Mike Montauk Gonzalez, Manteca, CA (US)

( * ) Notice: Subject to any disclaimer, the term of this patent is extended or adjusted under 35 U.S.C. 154(b) by 214 days.

(21) Appl. No.: 15/426,010

(22) Filed: Feb. 6, 2017

(65) Prior Publication Data

US 2018/0224132 A1    Aug. 9, 2018

(51) Int. Cl.

| F24D 17/00 | (2006.01) |
|---|---|
| E04D 13/17 | (2006.01) |
| F24S 10/75 | (2018.01) |
| F24S 80/30 | (2018.01) |
| F24S 60/30 | (2018.01) |
| B61D 17/12 | (2006.01) |
| F24S 20/67 | (2018.01) |
| E04D 3/06 | (2006.01) |
| E04B 7/02 | (2006.01) |

(52) U.S. Cl.
CPC ......... *F24D 17/0021* (2013.01); *B61D 17/12* (2013.01); *E04D 3/06* (2013.01); *E04D 13/17* (2013.01); *F24S 10/753* (2018.05); *F24S 20/67* (2018.05); *F24S 60/30* (2018.05); *F24S 80/30* (2018.05); *E04B 7/022* (2013.01); *E04D 13/172* (2013.01); *Y02B 10/20* (2013.01); *Y02E 10/44* (2013.01)

(58) Field of Classification Search
CPC ......... E04D 13/17; E04D 3/06; E04D 13/172; F24D 17/0021; F24D 17/0015; F24S 60/30; F24S 10/753; F24S 20/67; F24S 80/30; Y02B 10/20; Y02E 10/44; B61D 17/12; E04B 7/022
USPC ....... 165/48.1, 48.2, 50, 53, 54, 56; 126/639
See application file for complete search history.

(56) References Cited

U.S. PATENT DOCUMENTS

| 4,186,726 A * | 2/1980 | Spencer ................. F24S 10/72 126/672 |
|---|---|---|
| 4,516,363 A | 5/1985 | Beaulieu et al. |
| 4,531,510 A * | 7/1985 | Barthez ................... F24S 50/40 126/591 |
| 4,712,338 A | 12/1987 | Trickel |
| 4,766,885 A | 8/1988 | Muramatsu |
| 5,131,458 A * | 7/1992 | Bourne ................. F24D 13/022 165/56 |

(Continued)

*Primary Examiner* — William V Gilbert (57) ABSTRACT

The invention can make up the entire roof of a building or vehicle, or be integrated into a portion of said roofs. This invention utilizes and reduces the amount of solar radiation that enters a building or vehicle via the roof. This system can include a water holding tank or a plurality of tanks, heat exchangers, fire sprinkler heads and various glazing options. Said heat exchangers are contained between the rafters or trusses, and takes advantage of thermal syphoning to store energy in said tank or said plurality of tanks. Additionally, this roof system can function as a fire suppression apparatus and a skylight apparatus that allows natural light into the structure, and may be integrated with LED lighting to illuminate the skylight glazing and interior space. The exterior upper covering may consist of a glazing material like tempered glass coupled with additional roofing elements or standard upper covering assemblies.

17 Claims, 9 Drawing Sheets

(56) References Cited

U.S. PATENT DOCUMENTS

| | | |
|---|---|---|
| 5,239,790 A | 8/1993 | Fetzer |
| 5,259,363 A | 11/1993 | Peacock et al. |
| 5,617,682 A | 4/1997 | Christopher |
| 6,357,512 B1 | 3/2002 | Baer et al. |
| 6,422,319 B2 | 7/2002 | Haase, III |
| 8,575,470 B2 | 11/2013 | Dehlsen et al. |
| 2009/0301687 A1* | 12/2009 | Watts .................. H01L 35/00 165/48.2 |

* cited by examiner

ADVANCE HYBRID ROOF, ADVANCED COOL ROOF, ADVANCED SOLAR ROOF, READY ROOF

CROSS-REFERENCE TO RELATED APPLICATIONS

Not applicable.

STATEMENT REGARDING FEDERALLY SPONSORED RESEARCH OR EMPLOYMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The invention relates to hybrid cool roof systems, specifically cool roof systems and solar roof systems. The invention will be more than just a hybrid cool roof, the Advanced Cool Roof system occupies the space of a typical roofing system while providing cool natural light, a night-skylight, a fire suppression apparatus, hot water and improved building energy efficiency.

A cool roof reduces the amount of solar heat that a roof absorbs and helps maintain the temperature inside the structure that resides below the roof. This is typically achieved by reflecting ambient and radiant heat. Attics under a typical roof get hot and this energy is exhausted via roof vents. The heat and visible light that is reflected or rejected, could instead be utilized to reduce a building's energy cost.

A solar roof absorbs solar heat that the roof receives, of which typically has a roof pitch or tilt towards the equator, by attaching a heat exchanger assembly or panels onto the exterior upper covering of a roof or as cladding on a roof. This type of system typically adds stresses to the roof structure and may not be esthetically pleasing. The heat exchanger's efficiency varies with surface area, heat absorbing medium, and the length of time allowed for heat transfer. Wind can cool or remove heat away from exterior type heat exchangers and reduce its potential effectiveness. The said absorbed heat is typically utilized for water heating or interior temperature conditioning.

Energy prices and greenhouse gas emissions are of concern to large populations and countries. Green energy design and standards are becoming more desired by consumers, giving rise to a large economic market. This invention greatly improves the way in which water is stored and heated in small and mobile homes. The additional features of natural light, fire suppression, and vaulted ceilings are desirable to owners and occupants.

The Advanced Cool Roof system has a preferred embodiment utilizing piping containing water as the heat exchanger, and a specially designed water tank or a plurality of tanks for heat storage. Additionally, insulation and glazing are assembled to create skylights that allow cool natural light to enter the interior space. Said heat exchanger and skylights may be contained between the rafters or trusses, and thereby embody the roof of which is desired to be pitched or tilted towards the equator. Furthermore, the heat exchanger system takes advantage of thermal syphoning to transfer energy to the storage tank or the plurality of tanks, and may include fire sprinkler heads directed toward the interior space as to release the system water to suppress a fire. This system functions without the need of electricity, using solar energy to heat water and illuminate the skylights, using the natural phenomena of thermal syphoning to transfer heat into a storage tank, and using gravity to discharge a tanks' volume of water from said fire sprinkler heads.

BRIEF SUMMARY OF THE INVENTION

The Advanced Cool Roof can make up the entire roof of a building or a vehicle, or be integrated into a portion of said roofs. This system reduces the amount of solar radiation that enters a building or a vehicle via the roof by utilizes this energy.

Thermal energy is stored in a water tank or a plurality of tanks which are located under the roof's upper covering and at the roof peak, as to take advantage of thermal syphoning and to be more aesthetically pleasing than exterior mounted systems. The base of the water tank or plurality of tanks, acts as a collar-beam and purlin, therefore putting little or no additional stress on the structure, and injunction with the skylight and heat exchanger assembly, improves the roof's load-bearing capacity. Additionally, the base of the tank can be defined as the interior surface of the roof or the ceiling.

The water tank or plurality of tanks, have upper and lower connections for the heat exchanger. The upper connections are angled parallel to the roof pitch as to allow easy construction and maintenance of the heat exchanger, while maximizing thermal syphoning. Below the heat exchanger are insulation foam boards that create an air gap. Said foam boards and air gap greatly reduce the amount of heat that radiates through the roof and increases the amount time for the heat exchanger to absorb and transfer the heat to the water tank or plurality of tanks. Alternatively, denim insulation padding or any insulation available on the market can be used while taking into consideration its proximity to or contact with the heat exchanger.

Additionally, openings in said foam board insulating material allow for skylight glazing options. Use of glass blocks can make for faster assembly and maintenance. The said glass blocks can slide in and out of open channels, provide safety concerning over head glazing, and include published specification ratings to inform about the transfer rate of radiant heat. An alternative option for said glazing is to use sheets of glass at ⅜-¾ inch thickness, securely seated in the upper and lower insulation foam boards, creating an insulating air gap that spans between rafters.

Furthermore, LED lighting can be integrated into said skylight to illuminate said skylight glazing and the interior space below said roof. Heat inherently radiates upward from the interior space, and can be absorbed by the heat exchanger and transferred to the water tank or plurality of tanks. The heat exchanger system is made up of piping and fittings that may accommodate fire sprinkler heads. Fire sprinkler heads connected to these fittings, protrude from the ceiling and are spaced adequately to provide fire suppression for the interior space of said roof system.

The heat exchanger, fire sprinkler head attachments and various skylight glazing options, together fit between rafters or trusses. Therefore the system occupies the space of a typical roofing system while providing cool natural light, a fire suppression apparatus, and improved building energy efficiency. This system assembly can embody a vaulted roof or ceiling, creating a desirable open interior space. The exterior upper covering consists of a glazing material such as tempered glass, polycarbonate, or any other transparent waterproofing material, and in junction with additional roofing elements like flashing and composite shingles applied to the roofing deck, create a waterproof covering.

The Advanced Cool Roof can be varied as a fire extinguishing advanced cool roof or a skylight advanced cool roof, and works for new or existing buildings. The water tank or plurality of tanks generate hot water for use in showers, sinks, interior heat radiators and the like. By expanding the system into the exterior walls (i.e. South wall) below the roof, additional energy can be captured in winter months or excess heat can be released via the north roof and walls.

The heat exchanger pipes can be an 'open system' that contains the potable water, or a 'closed system' that never mixes with the potable water. The closed system piping passes through the tank and radiates heat into the water, allowing for the use of propylene glycol, yet creating the need for a dedicated fire suppression line connected to the tank.

Due to the potential for the system to produce steam and increase system pressure, a pressure relief valve or output line is included. Said output can allow steam to be utilized to heat a sauna area, heat a bench seat in a sauna or bathroom, or utilized by a small turbine to produce electricity. Additional components for the system can be implemented for various applications, like during winter months there is a potential for water in pipes to freeze and burst. Therefore, valves are implemented to allow the system to be drained for maintenance or extreme cold temperatures. The invention can be integrated with a wood or a gas stove to alternatively heat water as a boiler. This application can produce steam to generate electricity in said small turbine, heat interior radiators and also keeping pipes from freezing.

The roof area directly above the tank or plurality of tanks, is typically used as work space for maintaining the system, which can also be performed from the eave and rake edges of the roof as well. This roof area can also accommodate electrical solar panels and create a fully sustainable dwelling.

BRIEF DESCRIPTION OF THE DRAWINGS
SEVERAL VIEWS OF THE DRAWING

DETAILED DESCRIPTION

Figure 1:
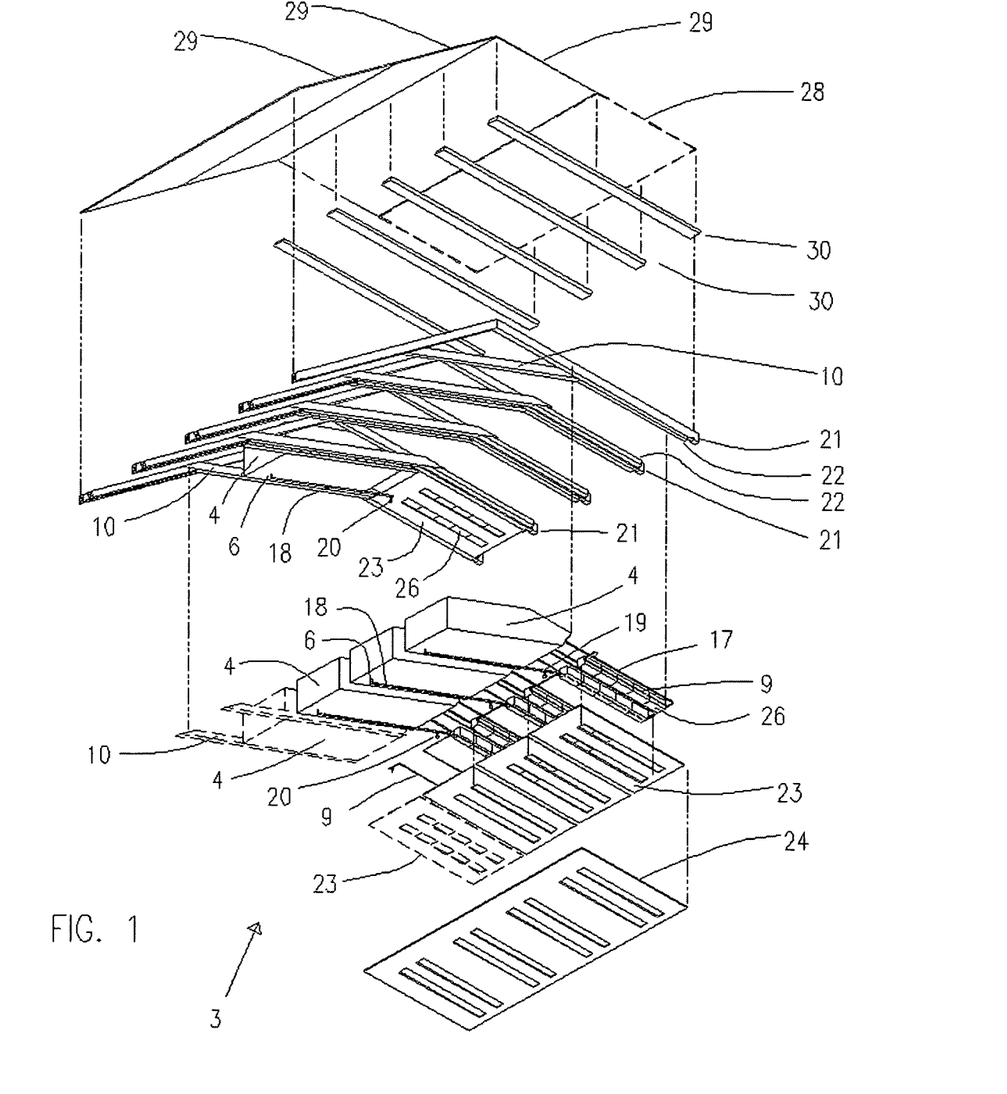
FIG. 1 is a three dimensional exploded bottom view of the invention.

FIG. 1 shows the components that make up the advanced cool roof 3 in an exploded view from underneath and would be the interior view. In the drawing there are three storage tanks 4 removed in the exploded position and one storage tank 4 shown in the mounted position, between the framing rafters 21 and at the peak. Said tank 4 can be composed of plastic, metal, fiberglass, ceramic or wood with a waterproofing barrier, and are attached to a tank base beam 10 by means that is appropriate for the composition used.

Tank 4 is mounted between the rafters 21 by attaching the tanks base collar beam 10 to the rafters 21, structurally creating beams between the rafters 21. When attaching the column members 22 to the rafters 21, they may be recessed from the rafters 21 interior surface so that the skylight platform 23 can be fitted and attached. The skylight platform 23 is attached to the column members 22 and carries the skylight glazing blocks 26. The column members 22 meet with the tanks' base collar beam 10 as to distribute the tanks 4 load downward to the supporting wall or walls.

The skylight glazing blocks 26 can be wrapped with a LED light strip 9. The LED strip can be fitted in any pattern that allows any number of desired glazing blocks 26 to be illuminated. FIG. 1 shows a pattern with all glazing blocks 26 being wrapped with a strip of LED lights.

The roof framing consists of the rafters 21, column members 22 and collar-tie beams 10. The roof forms an angle or roof pitch that is desired to be between ten degrees and seventy degrees tilt, with the heat exchanger 17 facing toward the equator and having a tilt or pitch similar to the roof framing. If the advanced cool roof 3 is installed at a tilt of zero to ten degrees, then the collar-tie beams 10 may extend to the supporting walls 38 as rafters or trusses.

The heat exchanger 17 may consist of copper piping that is filled with water supplied from the tanks 4 lower connection 6 and supply line 18. This supply line 18 delivers water to the heat exchangers' 17 multiple pipes via a single large pipe or manifold. The supply line 18 can include tee fittings 19 that allow the attachment of fire sprinkler heads 20, and said fitting 19 can be incorporated it the heat exchanger pipes, as to accommodate for fire sprinkler head 20 coverage area or esthetics.

The exterior upper covering of the advanced cool roof 3 consists of a roof decking 29 and may be coupled with glazing 28. The roof decking 29 can be any desired plywood that is ideal for roofing or even sheet metal type roofing. The upper glazing 28 is desired to be tempered glass at any desired thickness, yet can be any type of transparent and waterproof glazing such as polycarbonate.

FIG. 1 shows the use of rafter upper standoffs 30. These standoffs 30 allow for flashing attachments to be applied at the roofs' rake edges, where the roof may extend beyond the advanced cool roof 3, and the standoffs 30 also reduce surface area tension on the upper glazing 28. Felt or cloth padding may be used between the standoffs 30 and upper glazing 28 to further reduce tension and shock that the upper glazing 28 may experience.

The upper and lower edges, or peak and eave edges, of the upper glazing 28 should be attached using roofing elements such as a waterproof sealant like silicone, fasteners and metal flashing. The roof decking 29 is coupled with additional roof elements like tar paper and shingles, of which overlaps the peak edge of the upper glazing 28 and underlaps the eave edge of the upper glazing 28.

The interior paneling 24 is for esthetic purposes and is not required, yet can be any type of desired finish which is typically plywood or sheet rock, and is attached to the rafters 21.

Figure 2:
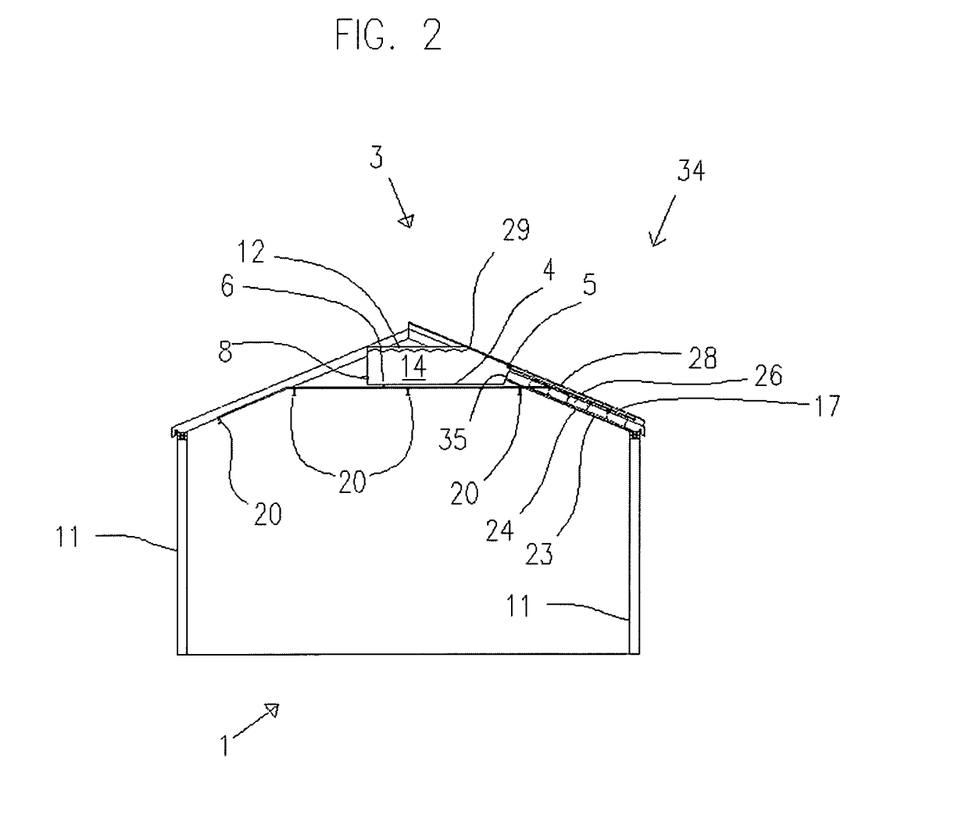
FIG. 2 is a side view of the invention on building walls.

FIG. 2 is a side view of the invention installed on building 1 walls 11. A tank 4 is mounted just under the peak of the roof.

A buildings 1 water supply, like municipal water, is connected to the tank 4 at the supply connection 8 and fills the storage area 14. Water flows freely out of the tank's 4 lower connection 6 and to the sprinkler heads 20, as well as to the heat exchanger 17 and back into the tank 4 through its upper connections 5.

Solar radiation 34 passes through the upper glazing 28 and reaches the heat exchanger 17 and skylight glazing blocks 26. Said solar radiation 34 heats up the heat exchanger 17 pipes, as well as illuminate the glazing blocks 26 and the buildings' 1 interior space. The heat exchanger 17 delivers the heated water into the tank 4 through the tanks' upper surface outlet connections 5. Throughout the day the tank water 14 is heated and flows via thermal syphoning. A pump may be fitted to circulate heat exchanger 17 water and potentially improve its efficiency. Said tank water 14 exits the tank 4 through its output connection 7 and is delivered to the source of demand, like a shower or sink.

If the tank water 14 heats up enough to create steam and pressure, then this steam and pressure can be allowed to exit through the pressure relief connection 12. This connection 12 can exhaust to the buildings exterior, or be plumbed to be utilized for heating a bathroom fixture, a steam room, or for any such steam or pressure function.

FIG. 2 shows the tank 4 placed against the roof decking 29 and strategically allocates the tank's 4 upper surface outlet connection 5 and the heat exchanger 17 close to the roof decking 29. The roof decking 29 is coupled with the upper glazing 28 using a waterproofing sealant like silicone, bolt fasteners, and metal flashing.

Additionally, a water catchment system can be installed to capture water for use by the advance cool roof 3. The interior ceiling 24, can be created using plywood or sheetrock. Similar to the interior paneling the water catchment system and the interior ceiling is not required for the advance cool roof 3 to function.

Figure 3:
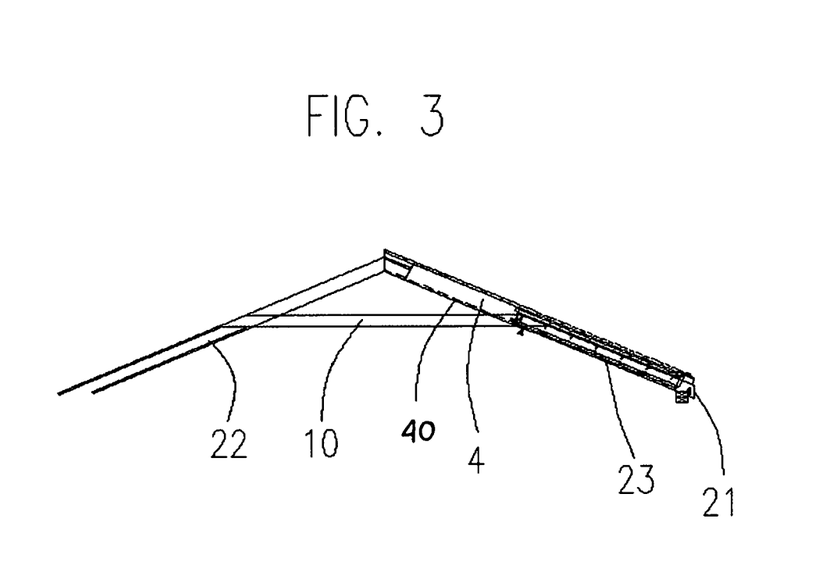
FIG. 3 is a side view of the invention with a variation of the tank.

FIG. 3 shows said tank 4 in an alternate state with said tank's volume contained between the rafters 21, and so depicts the possible variations of tank 4 shape and volume that exists between FIG. 2 and FIG. 3.

Figure 4:
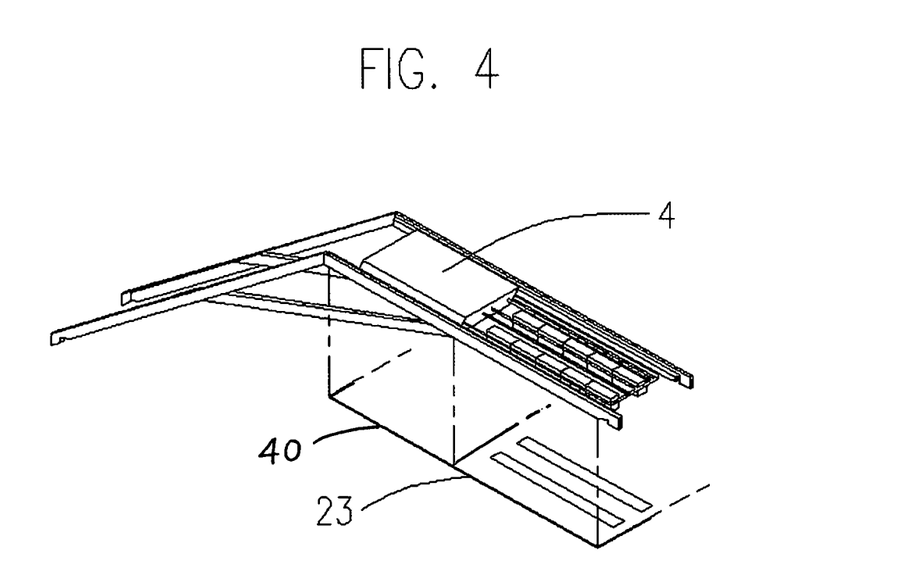
FIG. 4 is a three dimensional view of a tank shown in FIG. 3 and for clarity is shown without all components.

FIG. 4 shows a three dimensional view of a tank 4 in FIG. 3 and is shown with the skylight platform 23 and the tank platform 40.

Figure 5:
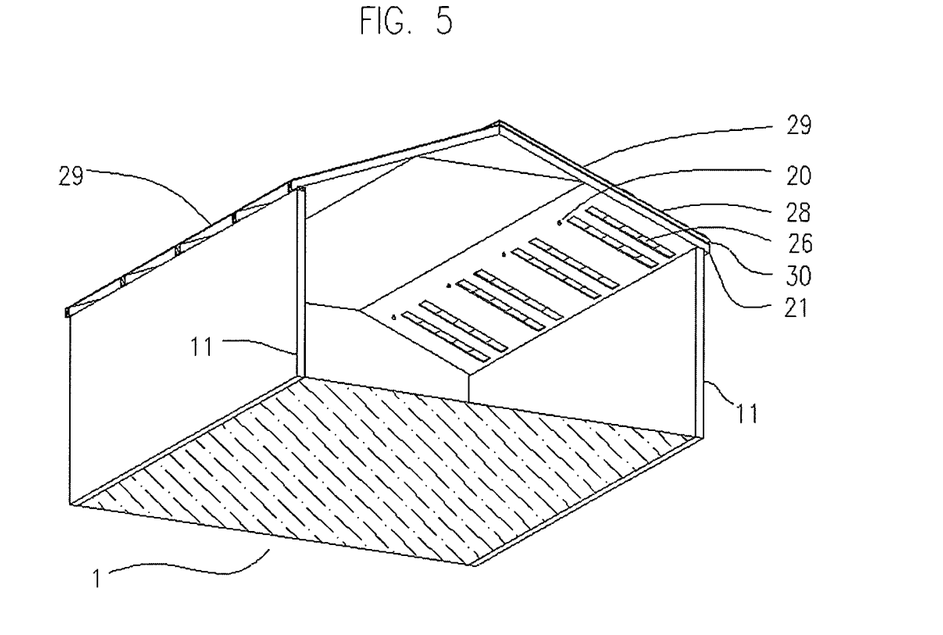
FIG. 5 is a three dimensional view of the invention on a building.

FIG. 5 shows the underneath view of the advanced cool roof 3 on walls 11, which is the interior view of a building 1. The roof upper decking 29 and roof upper glazing 28 are shown to be mounted on the roof decking standoff 30. Said roof decking standoffs 30 are best used when incorporating an advanced cool roof 3 into an existing roof. By using rafters on the advance cool roof 3 section that are larger than the rafters on the existing roof section, then a difference in roof height is maintained and said roof decking standoffs 30 are not needed for flashing purposes.

The interior ceiling height is controlled by the tank 4 dimensions. The tank 4 height can be decreased and allow for the ceiling height to be closer to the peak. The shape of the interior ceiling improves how natural light is spread throughout the interior space.

The amount of natural light that enters the skylight glazing blocks 26 or skylight glazing sheets 27 can be controlled by using a sliding cover. If so desired, the quantity of skylights overhead glazing that are installed can be reduced, thereby decreasing the amount of natural light, as well as allow for additional heat exchanger 17 pipes that would otherwise pass directly over the skylight. This reduction in skylights affects the interior esthetics by reducing the quantity of openings in the skylight interior covering 24, as well as allow additional locations to position fire sprinkler heads 20.

Figure 6:
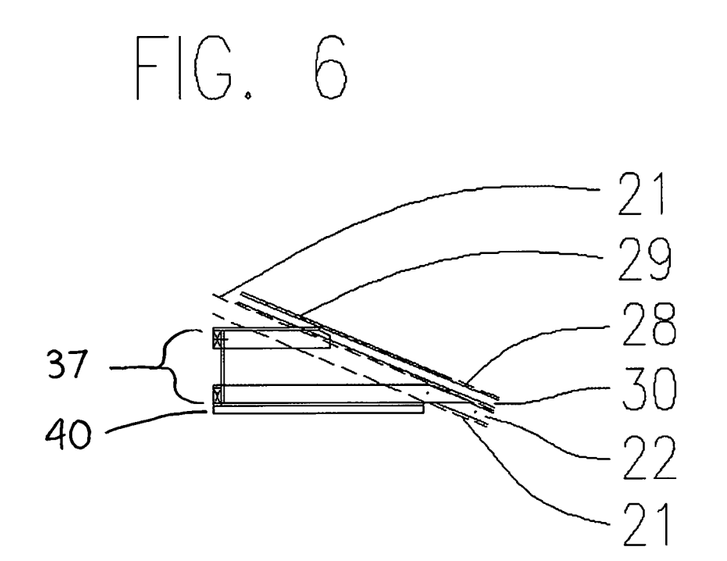
FIG. 6 is a side view of a variant for the invention.

FIG. 6 shows an outside side-view of the wooden tank 4 and depicts the position of the tank 4 in reference to the roof upper decking 29, the roof upper glazing 28, the rafters 21 and column members 22. The tank base is shown here as a tank platform 40 and with a tank socket 37.

Figure 7:
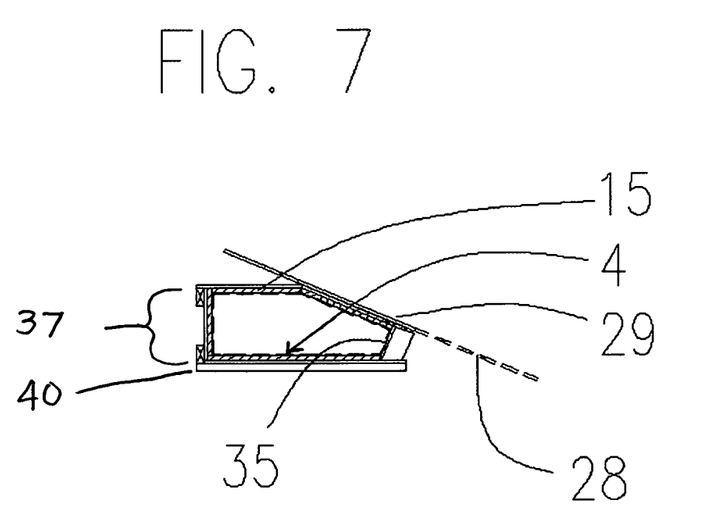
FIG. 7 is a center sectional view of a variant tank for the invention.

FIG. 7 shows a sectional view at the center of the wooden tank and depicts the tank insulation 15 as hatching, and the tank plastic liner 16 that creates a waterproof barrier from said insulation 15 and wooden tank shell being the tank frame. The tank base is shown here as a tank platform 40 and a tank socket 37.

Figure 8:
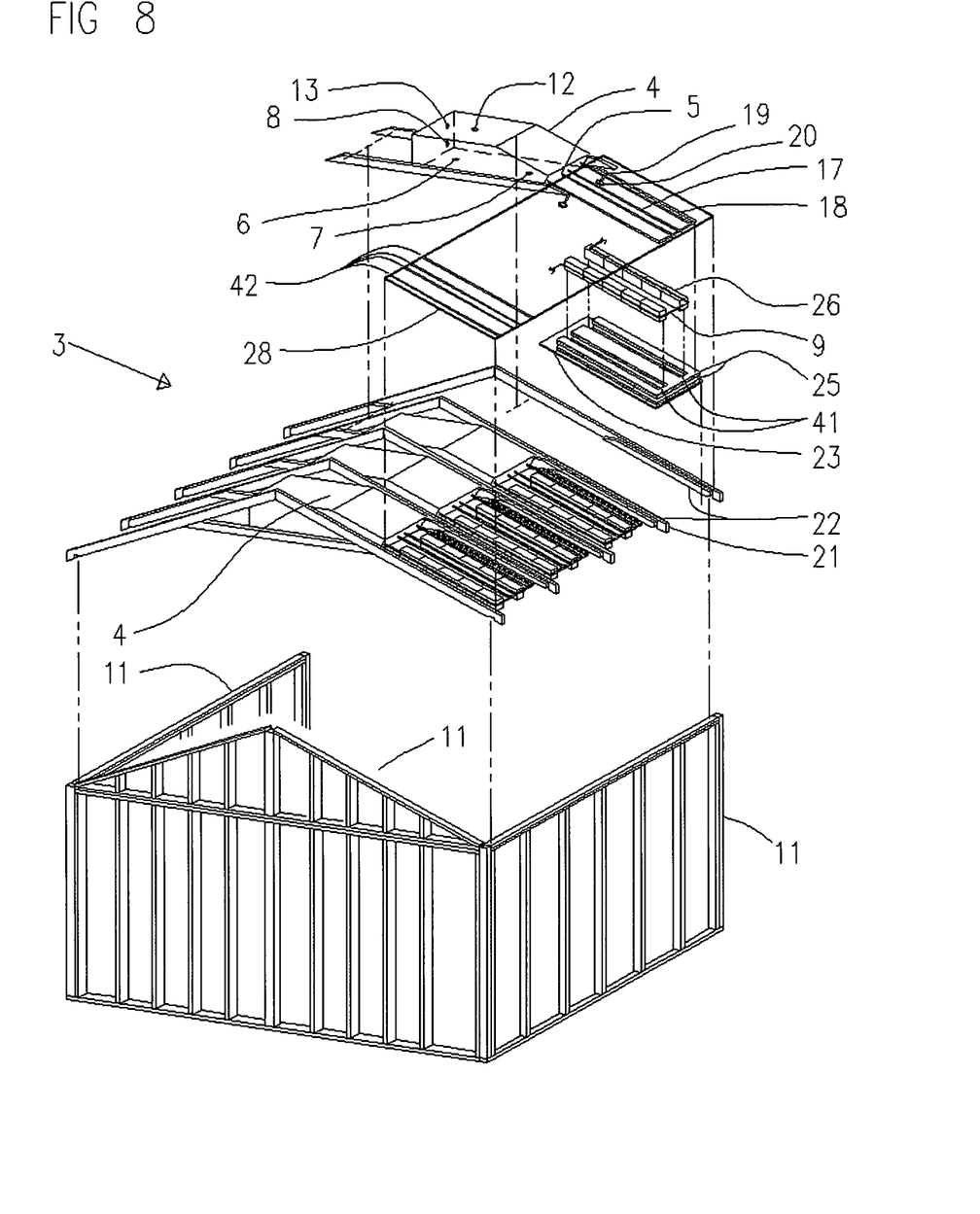
FIG. 8 is a three dimensional and exploded top view of the invention.

FIG. 8 shows an exploded view of an advanced cool roof 3 and walls 11. In the figure, three tanks 4 are mounted between roof rafters 21 with tank base collar beams 10. The skylight platform 23 and the skylight insulation 25 are shown in the exploded portion of the drawing, yet for clarity are not shown on the three mounted tanks 4.

FIG. 8 also shows an inlet for a level switch 13 that may be a combination sensor switch that also detects temperature, or simply a float type switch that stops the water supply flow into the tank 4, similar to a toilet tank float switch. A tank 4 that is made as a single liquid-tight unit, can be used without the water level switch and will instead operate at the water supply pressure that is connected to the tank 4, yet this may effect thermal syphoning that occurs in the heat exchanger 17.

In FIG. 8, the lower connection 6 is positioned near the tank water supply connection 8 to encourage initial water flow through the heat exchanger 17. The hot water outlet connection 7 can be placed in the tank 4 bottom and closer to the heat exchanger 17 as to be capable of using the entire tank capacity when a continuous water supply is not available, and to be near the source of hot water creation.

Near the upper connections 5 of the tank 4, two fire sprinkler heads 20 are shown in two of many possible locations and options. Fittings 19 can be incorporated into a heat exchanger 17 pipe, or into the supply line 18, allowing the connection of fire sprinkler heads 20 that have sufficient coverage.

The pressure relief connection 12 can be positioned left or right of the peak to allow for direct exhaust of steam through a pipe exiting near the roof peak. It is preferable to plumb this connection to be distributed and allow utilization of steam elsewhere, and further reduce a buildings energy cost.

The upper and lower edges of the upper glazing 28, also known as the peak and eave edges, may be fastened with lag bolts and flashed using a roof sealant like silicone and metal flashing.

In FIG. 8, the end walls 11 on the roofs rake edge, continues up to the tank frame.

The lower skylight insulation board 25 can be mounted directly on the skylight platform 23, and the skylight glazing blocks 26 can slide down the opening in the foam board 25. The upper skylight insulation board 25 is mounted on top of the column members 22. The LED lighting 9 is installed between the two skylight insulation 25 and illuminate said glazing blocks 26.

Figure 9:
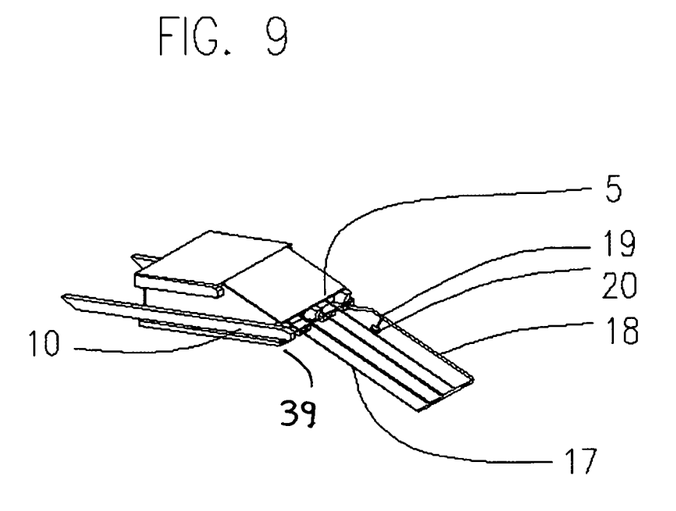
FIG. 9 is a three dimensional top view of a variant tank.
Figure 10:
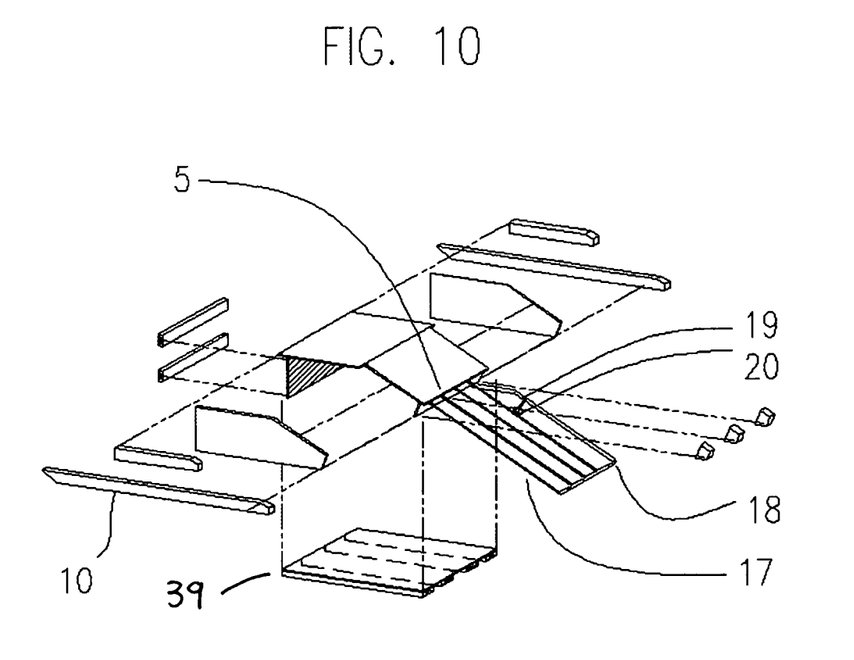
FIG. 10 is an exploded top view of a the variant tank in FIG. 10.

FIGS. 9 and 10 show a wood tank 4 which can be used when plastics and metals are not available to construct a tank 4 shell, or when plastics and metals are preferred not to be used. This wooden tank 4 is a shape amongst the prototype tanks studied and tested and is shown in a three dimensional top view in FIG. 9, and is shown in an exploded view in FIG. 10.

The tank 4 is shown with the tank base collar beam 10 for attachment to the rafters 21 of the roof framing. The shell of said wooden tank 4 is made with half an inch plywood that is reinforced and assembled with two-by-four wood segments, such as the base collar beam 10. The tank base 39 is constructed firm using two-by-four's to distribute weight. Said tank base 39 may be molded as part of a plastic tank shell 4, or separate as a tank platform with base collar beams 10 and with said tank 4 on top of the tank platform. The surface of the tank that includes the upper connections 5, is reinforced using three blocks to resist movement or stress during maintenance of the heat exchanger pipes 17.

The heat exchanger 17 is shown with four pipes that connect to the tank 4 at the upper connections 5. Said heat exchanger 17 is supplied with water from the supply pipe line 18 which originates from the tank 4 lower connection 6. Included in the heat exchanger 17 supply line 18, is a fitting 19 that allows for the connection of a fire sprinkler head 20.

Figure 11:
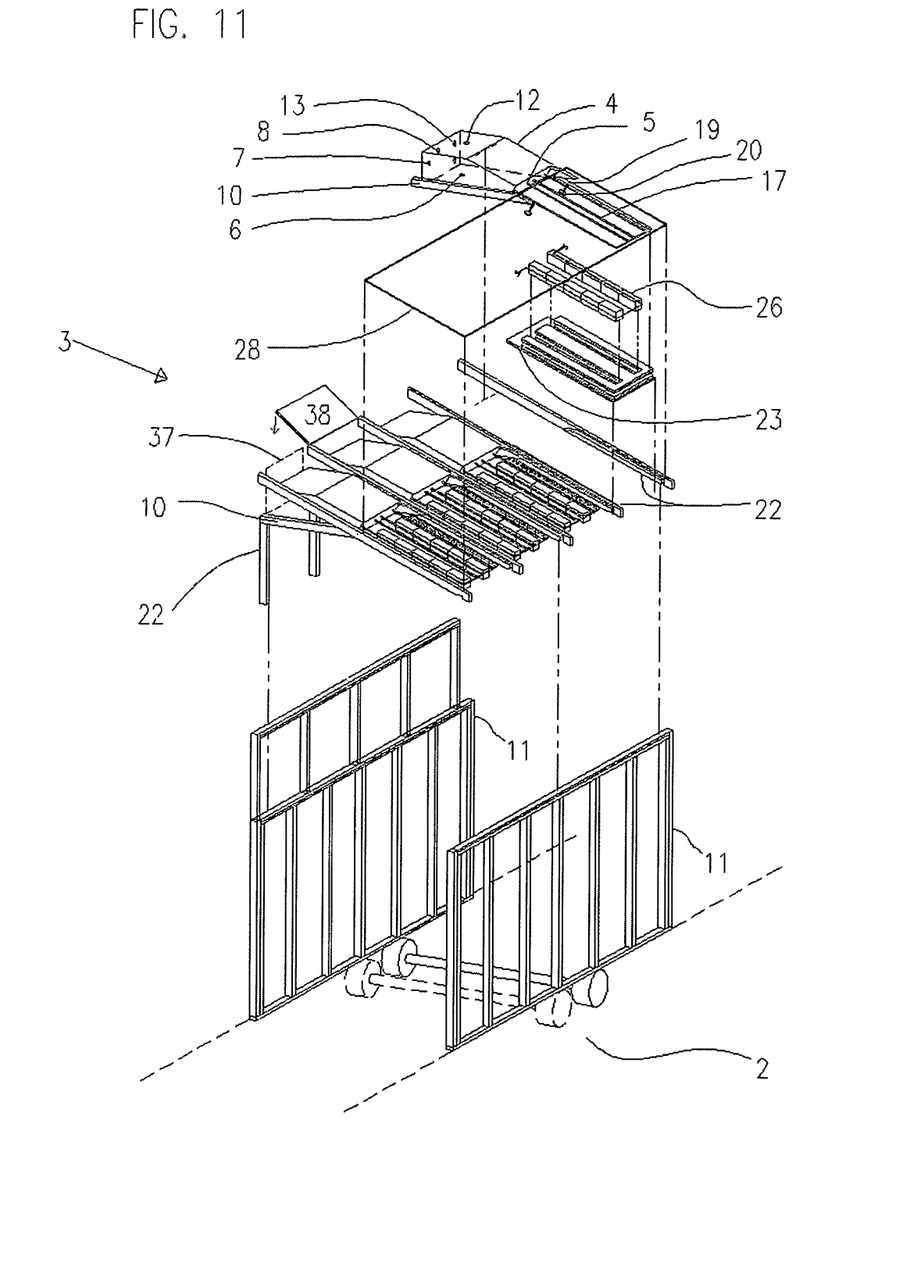
FIG. 11 is a three dimensional and exploded top view of the invention in mobile form, as on a trailer, a vehicle, or vehicle walls.

FIG. 11 shows the invention 3 installed on vehicle 2 walls 11. Three tanks 4 are shown mounted to the tank frame in a tank socket 37 with a hatch 38 and, for clarity, are shown without other components like the skylight platform 23 and skylight insulation 25. One tank is shown in an exploded view that includes the components that make up the invention.

A vehicle 2 may be self propelled like a motorhome or towed like a recreational vehicle, or by any other means that would make it mobile. The advanced cool roof 3 is shown in a shed style roof which consists of rafters 21 connected to only one side of the peak.

The preferred side of the vehicle 2 for the peak would be the side closest to the center of the street when traveling forward, yet either side is viable. The vehicle size may vary in length and so is shown using dashed lines. The advanced cool roof 3 is supported on the vehicle 2 walls 11. The front and back walls are not shown for clarity.

In FIG. 11, a tank 4 or plurality of tanks 4 are attached to the rafters 21 and side wall studs via the tank base collar beams 10. The column members 22 additionally support the tank 4. An interior upper covering or interior ceiling can be installed to improve the esthetics.

The advanced cool roof 3 upper glazing 28 is fastened using lag bolts. Said glazing 28 allows solar radiation to pass through and be utilized for heating water inside the heat exchanger 17, and to illuminate the skylight glazing blocks 26 and the vehicle 2 interior space. The upper roof decking 29, not shown for clarity, continues from the top edge of the upper glazing 28 to the peak of the rafters. The mating edges of the upper glazing 28 and the roof upper decking 29, as well as the outside edges of said glazing 28 and decking 29, are flashed with a waterproof sealant and metal flashing.

FIG. 11 shows a tank 4 with inlet connections and outlet connections that allow it to function. This includes a tank water supply inlet connection 8, a hot water outlet connection 7, a pressure relief outlet connection 12, a water level switch inlet connection 13, lower surface outlet connections 6 and upper surface outlet connections 5. The heat exchanger 17 heats water that is supplied from the tank 4 via the supply line 18 connected to the tanks' 4 lower surface outlet connection 6, and transfers the heated water back into the tank 4 via the upper surface outlet connections 5.

The drawing also shows two fire sprinkler head 20 attached in two of many possible locations. The fire sprinkler heads are attached to the heat exchanger 17 pipe and the heat exchanger supply 18 pipe with a tee fitting 19. Two fire sprinkler heads 20 would not normally be installed so close together because the sprinkler coverage would overlap more than necessary.

The skylight platform 23 is shown installed from the interior side of the vehicle 2, or the bottom side of the roof 3, and is shown mounted to the column members 22. The insulation accommodates the skylight glazing blocks 26 and the skylight LED string 9.

Figure 12:
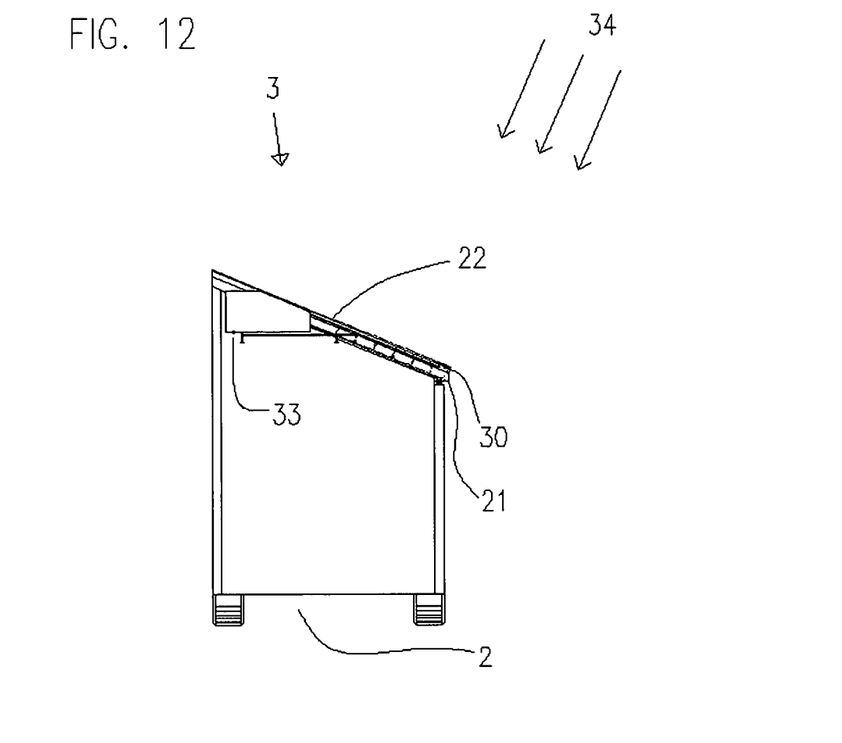
FIG. 12 is a side view of the invention on a vehicle, or vehicle walls.

FIG. 12 is a side view of the invention 3 incorporated on top of a vehicle 2. The vehicle 2 is ideally positioned with the roof facing toward the equator where it can accept optimal sun radiation 34. The vehicles 2 interior components, like seats or appliances in a recreational vehicle, should be placed as to help balance the top heavy weight of the water stored 14 inside said tank 4.

FIG. 12 shows the invention 3, the roof decking standoffs 30 and the location of a system drain valve outlet connection 33.

The column member 22 is shown recessed from the rafters 21 interior surface and the skylight platform 23 can be seated flush with the rafters 21 interior surface, and esthetically covered with the interior skylight covering 24. By not recessing the column members 22, the skylight platform 23 can be allowed to overlap the rafters 21 interior surface and thereby remove the need for use of a skylight interior upper covering 24. The column members 22 help distribute a portion of the tank weight and water weight.

Figure 13:
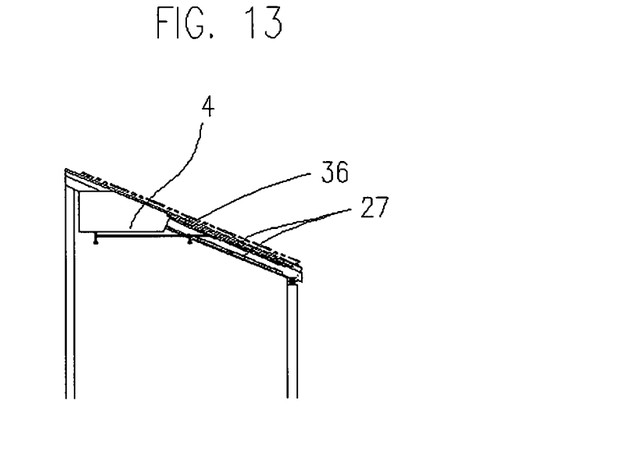
FIG. 13 is a side view of overhead glazing sheets used in the invention.

FIG. 13 shows the invention 3 in an alternate state that includes skylight glazing sheets 27 in place of the skylight glazing blocks 26. Said skylight glazing sheets 27 can be seated into the skylight insulation boards 25. A photovoltaic cells 36 according to claim 6 is shown.

The invention claimed is:

1. A thermal hybrid roof, being used for roofing over a base area or a built volume, comprising:
    a tank;
    said tank composed of a material selected from the group consisting of metal sheeting, cast metal, fiberglass, ceramic, wood and molded plastic, said tank further comprising insulation;
    a tank frame;
    said tank frame having said tank being installed as a liner in said tank frame as a liquid barrier for containing water;
    said tank having an inlet connection or a plurality of inlet connections;
    said tank having a plurality of outlet connections;
    said inlet connection or said plurality of inlet connections allowing for inlet water to be supplied to said tank;
    said plurality of outlet connections allowing for the utilization of said contained water and for connecting a heat exchanger, said plurality of outlet connections for said heat exchanger further comprising an upper surface outlet connection and a lower surface outlet connection, said upper surface outlet connection being angled in a downward direction as to make said heat exchanger be angled in a downward direction and away from said tank when said tank is in an installed condition;

said inlet connection or said plurality of inlet connections or said plurality of outlet connections having a pipe or a plurality of pipes being connected;

said pipe or said plurality of pipes being composed of a material or a combination of materials selected from the group of materials consisting of metal, plastic or glass, said pipe or said plurality of pipes further being used to create said heat exchanger;

said heat exchanger being beneath a roof decking and being coupled with said roof decking or being a part of the roof decking, said pipe or said plurality of pipes being angled similar to load-bearing frame members of said tank frame as to be angled in a downward direction away from said tank when said tank is in an installed condition, said heat exchanger further being supplied with said contained water from said tank, said contained water being supplied from a supply line extending from said lower surface outlet connection;

said tank frame further comprised of load bearing frame members being a plurality of rafters and a collar-tie-beam system;

said collar-tie-beam system further comprising a collar-tie member and a plurality of column members, said plurality of column members being pitched at a desired angle and being combined with said plurality of rafters as to be angled similar to said plurality of rafters, said collar-tie member being coupled on said plurality of column members, said collar-tie-beam system creating said tank frame having a tank base connection or having a tank platform, said tank base connection or said tank platform being beneath said roof decking and near a peak of said roof decking;

said tank or a plurality of tanks being mounted beneath said roof decking and being coupled with said roof decking or being a part of said roof decking, said tank being mounted as to position said upper surface outlet connection at an angle similar to load bearing frame members being said plurality of rafters or said plurality of column members; and said roof decking further comprising a clear roof decking being a glazing panel or an opaque waterproof roof decking, said roof decking extending over said heat exchanger, whereby said heat exchanger piping extends substantially parallel to said roof deck, whereby said solar radiation heats said contained water in said heat exchanger and said contained water is delivered to said tank by thermal syphoning.

2. The thermal hybrid roof according to claim 1, further comprising;
said pipe or said plurality of pipes having a fitting or a plurality of fittings which allow for an auxiliary connection or a plurality of auxiliary connections; and
said auxiliary connection or said plurality of auxiliary connections being a fire sprinkler head.

3. The thermal hybrid roof according to claim 1, further comprising;
said roof decking further being coupled with another of said roof decking.

4. The thermal hybrid roof according to claim 3, further comprising;
said tank frame;
said tank frame having a space inherent to the load bearing framing members size creating a plenum, said plenum further being created using a skylight platform being attached to said tank frame, said plenum being filled with a combination of insulating material and overhead glazing; and said combination of insulating material and overhead glazing being coupled with a light source and being supported by said skylight platform or said plenum.

5. The thermal hybrid roof according to claim 4, further comprising;
said combination of insulating material and overhead glazing having an open channel or a plurality of open channels; and
the overhead glazing of said combination of insulating material and overhead glazing further comprised of sheets or blocks, said sheets or said blocks being sized appropriately for installation or removal of said overhead glazing from said open channel or said plurality of open channels.

6. The thermal hybrid roof according to claim 1, further comprising;
said roof decking being said clear roof decking or said opaque waterproof roof decking; or
said roof decking being a photovoltaic roof decking when assembled, said photovoltaic roof decking having a thermal transfer relationship with said heat exchanger.

7. The thermal hybrid roof according to claim 6, further comprising;
said tank frame;
said tank frame having a space inherent to the load bearing framing members size creating a plenum, said plenum further being created using a skylight platform being attached to said tank frame, said plenum being filled with a combination of insulating material and overhead glazing; and
said combination of insulating material and overhead glazing being coupled with a light source and being supported by said skylight platform or said plenum.

8. The thermal hybrid roof according to claim 7, further comprising;
said combination of insulating material and overhead glazing having an open channel or a plurality of open channels; and
the overhead glazing of said combination of insulating material and overhead glazing further comprised of sheets or blocks, said sheets or said blocks being sized appropriately for installation or removal of said overhead glazing from said open channel or said plurality of open channels.

9. The thermal hybrid roof according to claim 7, further comprising;
said pipe or said plurality of pipes including a fitting or a plurality of fittings which allow for an auxiliary connection or a plurality of auxiliary connections to be attached; and
said auxiliary connection or said plurality of auxiliary connections allowing said plurality of plumbing to be extended or to be routed to desired locations.

10. The thermal hybrid roof according to claim 6, further comprising;
said roof decking having said pipe or said plurality of pipes of said heat exchanger being embedded within said roof decking, said pipe or said plurality of pipes being made available by having connections to said pipe or said plurality of pipes; or
said roof decking further comprising a plurality of photovoltaic cells, said plurality of photovoltaic cells being embedded within said roof decking or being applied to said roof decking, said plurality of photovoltaic cells being made available by having a connection or a plurality of connections to said photovoltaic cells.

11. The thermal hybrid roof according to claim 6, further comprising;
  said clear roof decking being a ply or a sheet;
  said ply or said sheet having a lens strip or a plurality of lens strips being applied as to be in focal alignment with said pipe or said plurality of piping of said heat exchanger; or
  said ply or said sheet having a lens or a plurality of lenses being a part of said ply or said sheet by having glass rods or glass pipes being embedded.

12. The thermal hybrid roof according to claim 6, further comprising;
  said tank frame;
  said tank frame having a roof decking standoff or a plurality of roof decking standoffs, said roof decking standoff or said plurality of roof decking standoffs being used between said tank frame and said roof decking as to allow flashing attachments to be applied, as to reduce tension, or to incorporate the thermal hybrid roof into an existing roof.

13. The thermal hybrid roof according to claim 1, further comprising;
  said plurality column members being combined to a plurality of trusses as to create a free-standing collar-tie-beam system for being said tank frame.

14. The thermal hybrid roof according to claim 1, further comprising;
  said tank frame; and
  said plurality of column members of said collar-tie-beam system being recessed from the roof deck surface of said plurality of rafters or being recessed from the bottom surface of said plurality of rafters as to allow the inset attachment of a skylight platform or sheathing apparatus or a filler board between adjacent collar-tie members for interlocking adjacent frame members of said tank frame, said roof deck surface of said plurality of rafters being opposite of said bottom surface of said plurality of rafters.

15. The thermal hybrid roof according to claim 1, further comprising;
  said roof decking being coupled with a plurality of roof elements as to create a waterproof roof decking.

16. The thermal hybrid roof according to claim 1, further comprising;
  said inlet connection or said plurality of inlet connections or said plurality of outlet connections being used for the like of a circulator apparatus, a steam turbine apparatus, a switch apparatus, a sensor apparatus, a pressure relief apparatus, a pressure distribution outlet connection, a drainage apparatus, or a drainage outlet connection.

17. The thermal hybrid roof according to claim 1, further comprising;
  said roof decking having a roof socket or a hatch as to allow for the installation and access of said tank; or
  said tank frame having a tank socket or an insulated tank socket or a hatch as to allow for the installation and access of said tank.

* * * * *